United States Patent
Maytal

(10) Patent No.: US 6,724,871 B2
(45) Date of Patent: Apr. 20, 2004

(54) SYSTEM AND METHOD FOR ADDING MULTIPLE LINE CAPABILITIES TO AN EXISTING CPE WIRING SYSTEM

(75) Inventor: Benjamin Maytal, Mevasseret Zion (IL)

(73) Assignee: Smart Link Ltd., Netanya (IL)

( * ) Notice: Subject to any disclaimer, the term of this patent is extended or adjusted under 35 U.S.C. 154(b) by 348 days.

(21) Appl. No.: 09/885,174

(22) Filed: Jun. 21, 2001

(65) Prior Publication Data

US 2002/0006194 A1 Jan. 17, 2002

Related U.S. Application Data

(60) Provisional application No. 60/213,266, filed on Jun. 22, 2000.

(51) Int. Cl.[7] .............................................. H04M 11/00
(52) U.S. Cl. .................................................. 379/93.08
(58) Field of Search ......................... 379/90.01, 93.05, 379/93.06, 93.08, 93.09, 93.01, 93.28, 93.31; 370/352, 353, 354, 355

(56) References Cited

U.S. PATENT DOCUMENTS

| | | | | |
|---|---|---|---|---|
| 5,848,150 A | * | 12/1998 | Bingel | 379/93.09 |
| 6,044,403 A | | 3/2000 | Gerszberg et al. | |
| 6,075,784 A | | 6/2000 | Frankel et al. | |
| 6,130,893 A | * | 10/2000 | Whittaker et al. | 379/93.01 |
| 6,345,047 B1 | * | 2/2002 | Regnier | 370/352 |
| 6,522,730 B1 | * | 2/2003 | Timm et al. | 379/93.08 |

* cited by examiner

*Primary Examiner*—Stella Woo
(74) *Attorney, Agent, or Firm*—Eitan, Pearl, Latzer & Cohen Zedek LLP

(57) ABSTRACT

A telephony method and system for enabling a logical telephone line for a telephone station coupled to a personal computer coupled to a high-bandwidth channel is provided. A telephony method and system for enabling a logical telephone line for at least one telephone station coupled to an unused internal telephone line, which is coupled to a personal computer coupled to a high-bandwidth channel is also provided.

8 Claims, 5 Drawing Sheets

SYSTEM AND METHOD FOR ADDING MULTIPLE LINE CAPABILITIES TO AN EXISTING CPE WIRING SYSTEM

CROSS-REFERENCE TO RELATED APPLICATIONS

The present application claims priority from U.S. Provisional Application Ser. No. 60/213,266, filed Jun. 22, 2000, which is incorporated herein by reference in its entirety.

BACKGROUND OF THE INVENTION

High-bandwidth communication services are typically offered to homes and small offices through cable or over an external telephone line using digital subscriber line (DSL) services or integrated services digital network (ISDN). Many homes and small offices in North America have internal wiring adequate for two internal telephone lines.

Existing technologies, such as voice over DSL (VODSL) and voice over cable, enable the simultaneous delivery of data and one or more digitized telephone sessions over the high-bandwidth channel. However, in order for multiple telephone sessions to be accessible within the home or small office, either additional wiring within the home is required or an adapter is needed at each telephone jack. Such a system is described in U.S. patent application, Ser. No. 09/431,053 filed Nov. 01, 1999, which is incorporated herein in its entirety.

It would be beneficial to be able to add multiple line capabilities without requiring extra wiring in one's home and without requiring adapters.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings in which:

Figure 1A:
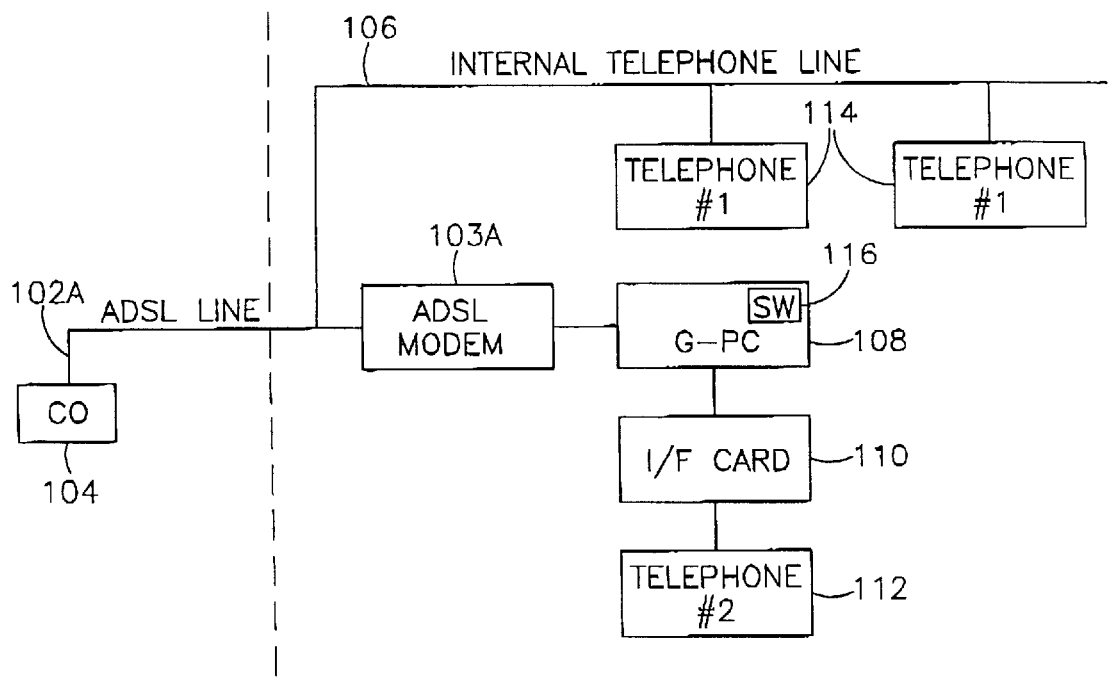
FIGS. 1A–1C are block diagram illustrations of a customer premises equipment (CPE) system for enabling one extra telephone session over an external high-bandwidth channel, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Various embodiments of the present invention will now be described. In some embodiments, which will be described hereinbelow with respect to FIGS. 1A–1C, an additional telephone session is enabled over an external high-bandwidth channel. In these embodiments, the additional telephone session is accessible via a telephone station coupled via an interface card (I/F) to a personal computer acting as a gateway (G-PC) to the external high-bandwidth channel.

In other embodiments, which will be described hereinbelow with respect to FIG. 4, an additional telephone session is enabled over an external high-bandwidth channel and an existing unused telephone wire. In these embodiments, the additional telephone session is accessible via one or more telephone stations coupled to the existing unused telephone wire. The unused telephone wire is also coupled via an interface card to a personal computer acting as a gateway to the external high-bandwidth channel.

In other embodiments, which will be described hereinbelow with respect to FIG. 6, the unused telephone wire is coupled via an interface card to an enhanced broadband modem acting as a gateway to the external high-bandwidth channel.

In further embodiments, which will be described hereinbelow with respect to FIG. 7, multiple additional telephone sessions are enabled using an existing internal telephone wire coupled to an external high-bandwidth channel. In these embodiments, each additional telephone session is accessible via a telephone coupled via an interface card to a personal computer. The personal computers are coupled through Home Phoneline Networking (HPNA) or some other local area network (LAN) to a personal computer acting as a gateway to the external high-bandwidth channel.

Figure 1B:
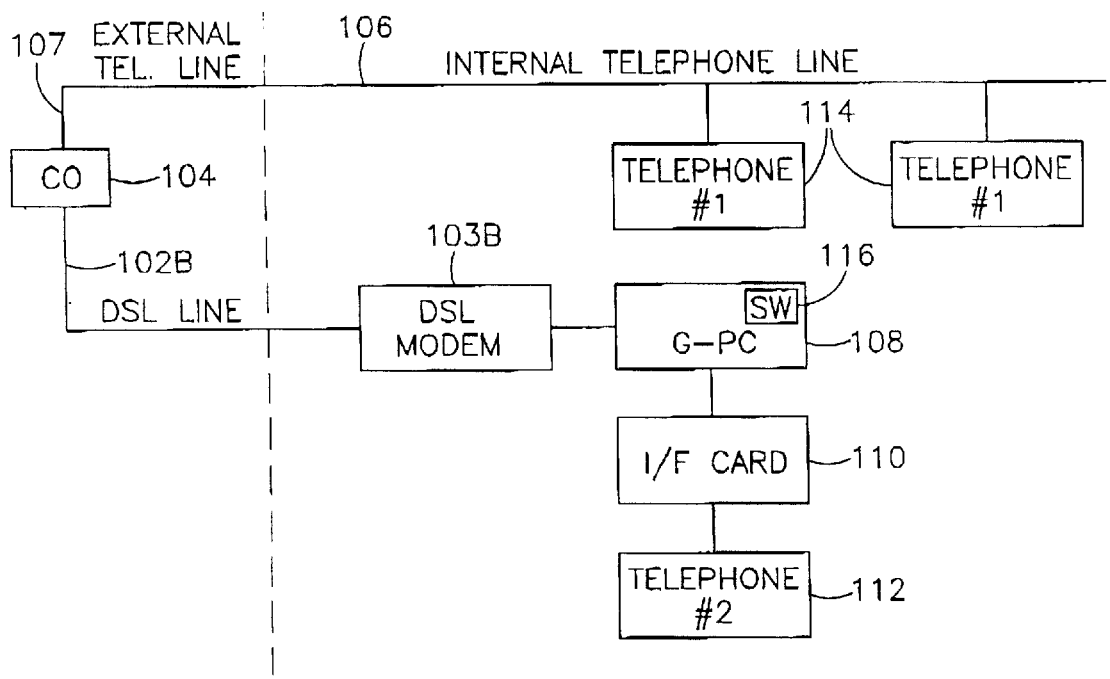
Figure 1C:
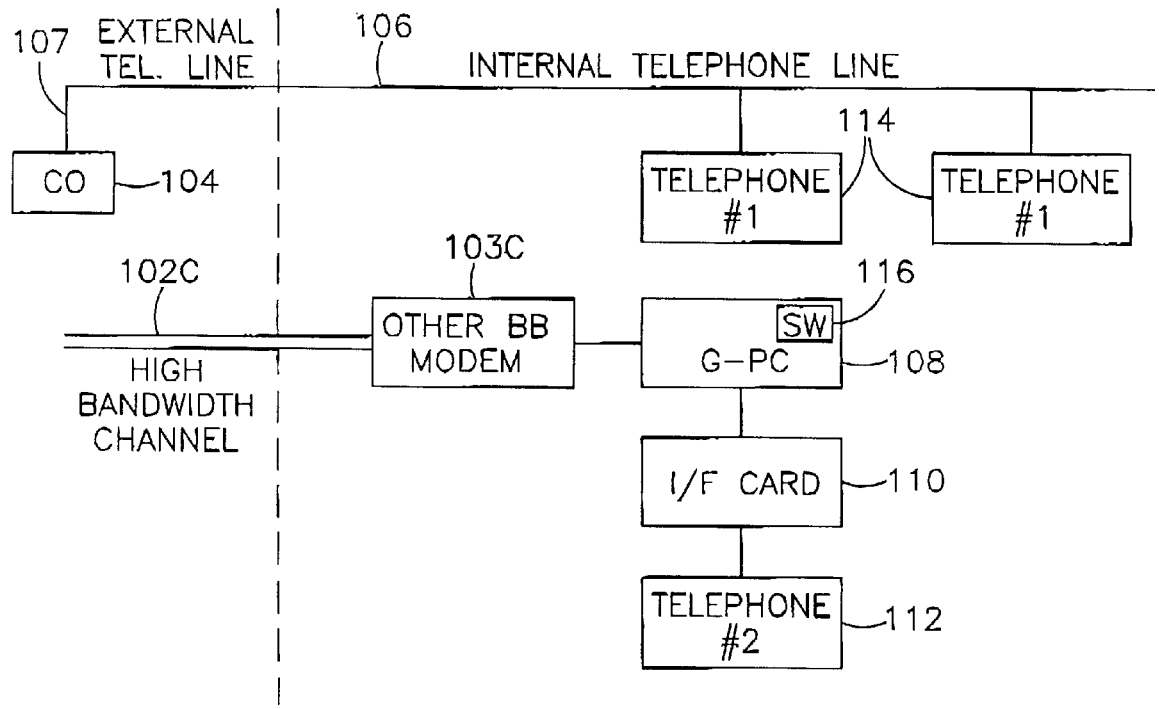

Reference is now made to FIGS. 1A–1C, which illustrate a block diagram of a customer premises equipment (CPE) system for enabling one extra telephone session over an external high-bandwidth channel, according to some embodiments of the present invention. Non-limiting examples of high-bandwidth channel include digital subscriber line (DSL), asymmetric DSL (ADSL), cable, integrated services digital network (ISDN) and wireless. In these embodiments, an external high-bandwidth channel 102 may be coupled to a broadband (BB) modem 103 at the customer premises.

In the case of external high-bandwidth channel 102 being an ADSL line 102A as described in FIG. 1A, ADSL line 102A is physically an external telephone wire connected to a central office 104. A regular analog telephone service may be provided over line 102A to internal telephone line 106 simultaneously with digital data provided to ADSL modem 103A.

In the case of external high-bandwidth channel 102 being a DSL or ISDN line 102B as described in FIG. 1B, line 102B is also physically an external telephone wire connected to central office 104. However, in these embodiments, internal line 106 is coupled to CO 104 via an external line 107 capable of carrying a normal analog telephone service.

In the case of another type of external high-bandwidth channel 102 such as cable line 102C described in FIG. 1C, line 102C may be coupled to the central office of the high-band service (not shown). In these embodiments, similar to the case of FIG. 1B, internal line 106 is coupled to CO 104 via an external line 107 capable of carrying a normal analog telephone service.

The CPE system may further comprise a gateway personal computer (G-PC) 108 coupled to modem 103 and an interface card 110. Interface card 110 may be either installed inside G-PC 108 or externally coupled to G-PC 108. G-PC 108 may comprise a gateway software 116 which will be described hereinbelow with respect to FIG. 2. Throughout the specification and claims, the term "personal computer" is meant to include any device having both processing power and network connectivity, for example a network computer, a set top box and a game machine.

The CPE may further comprise a telephone station 112 coupled to interface card 110. Other telephone stations 114 may optionally be connected to internal telephone line 106 through jacks. A first telephone number may be assigned by central office 104 to internal telephone line 106. It should be noted that, if a second internal telephone line exists, it is not physically connected to CO 104.

According to some embodiments of the present invention, a second telephone number may be assigned at central office 104 or by an Internet telephony service provider. Using existing voice over DSL (VODSL) technology, ADSL channel 102A may carry two telephone sessions simultaneously with data; one telephone session (using the first telephone number) destined for telephone stations 114 and the other telephone session (using the second telephone number) destined for telephone station 112.

Other high-bandwidth channels, such as DSL and cable (102B and 102C) may carry an additional telephone session destined for telephone station 112 simultaneously with data, using existing VoDSL or voice over cable technologies. In these embodiments, in addition to internal telephone line 106, an additional logical telephone line for telephone station 112 may be created.

Figure 2:
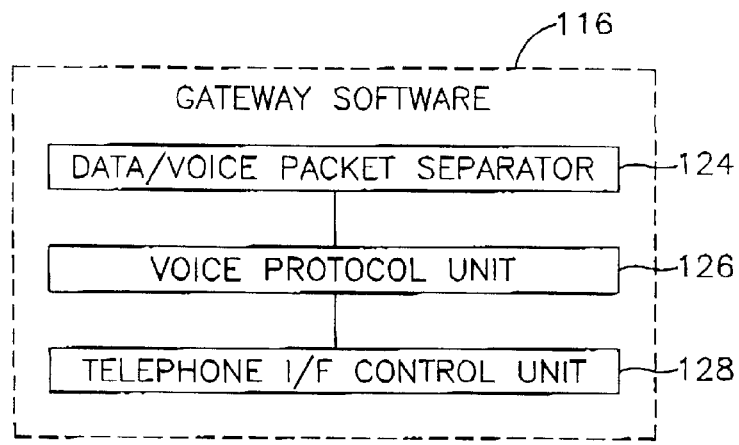
FIG. 2 is a block diagram of gateway software according to some embodiments of the present invention.

Reference is now made to FIG. 2, which is a block diagram illustration of gateway software 116 according to some embodiments of the present invention. Gateway software 116 may comprise a data/voice packet separator 124, a voice protocol unit 126 coupled to packet separator 124 and a telephone interface control unit 128 coupled to voice protocol unit 126.

Data/voice packet separator 124 may be adapted to receive the traffic from high-bandwidth channel 102 and to separate digitized voice packets from data packets. It is well known in the art how to implement packet separator 124 for asynchronous transfer mode (ATM), IP-based DSL and frame-relay traffic.

Digitized voice packets may include both telephone session control messages and digitized voice samples. Non-limiting examples of telephone session control messages include "ring", "more data coming for this telephone session", "off-hook", "begin call", and "call waiting".

Voice protocol unit 126 may be adapted to extract telephone session control messages from the digitized voice packets according to a given protocol for voice over a high-bandwidth channel, for example the VoDSL protocol from Jetstream Communications, Inc. of Los Gatos, Calif., USA. Voice protocol unit 126 may divide the digitized voice packets according to their telephone sessions. Voice protocol unit 126 may also identify the telephone session control message.

Telephone interface control unit 128 may be adapted to translate telephone events such as "on-hook", "off-hook" and "ring" into digital signals and vice versa.

Figure 3:
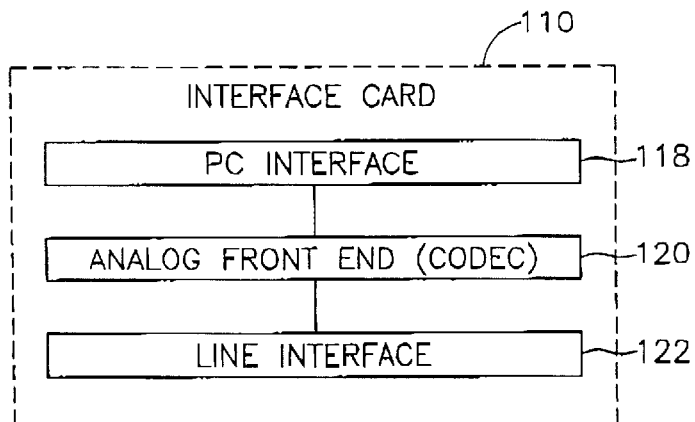
FIG. 3 is a block diagram of an interface card according to some embodiments of the present invention.

Reference is additionally made to FIG. 3, which is a block diagram of interface card 110 according to some embodiments of the present invention. Interface card 110 may comprise a PC interface 118, an analog front end (codec) 120 coupled to PC interface 118, and a line interface 122 coupled to analog front end 120. Gateway software 116 may provide the digitized voice samples belonging to the telephone session for the second telephone number to interface card 110. PC interface 118 may receive the digitized voice samples and provides them to analog front end 120, which converts them into analog voice samples and provides the analog voice samples via line interface 122 to telephone station 112.

Figure 4:
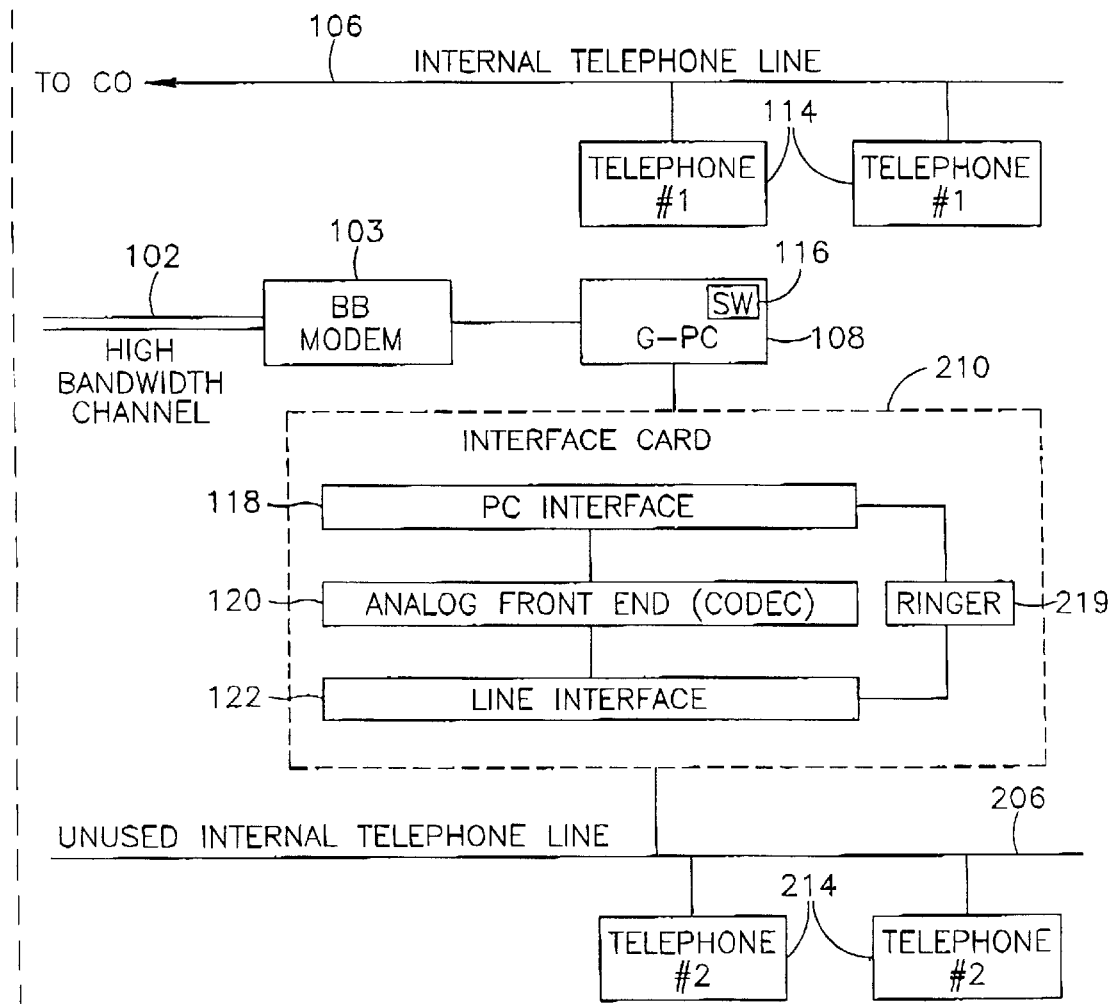
FIG. 4 is a block diagram illustration of a CPE system for enabling one extra telephone session over an external high-bandwidth channel and an existing unused telephone wire coupled to a gateway PC, according to some embodiments of the present invention.

Reference is now made to FIG. 4, which is a block diagram illustration of a CPE system for enabling one extra telephone session over an external high-bandwidth channel and an existing unused telephone wire, according to some embodiments of the present invention. A first telephone number may be assigned by central office 104 to internal telephone line 106. An unused internal telephone line 206 is also located at the CPE, but it is not coupled to CO 104 and does not previously have a telephone number assigned to it by central office 104.

Internal telephone line 106 may be coupled to CO 104 via an external telephone wire in as in the case of DSL and cable described in FIGS. 1B and 1C, respectively. Alternatively, telephone line 106 may be coupled to CO 104 via high-bandwidth channel 102 as described in FIG. 1A for an ADSL line.

The CPE system may comprise gateway personal computer (PC) 108 coupled to modem 103 and an interface card 210. Interface card 210 may be either installed inside G-PC 108 or externally coupled to G-PC 108. Interface card 210 may be coupled to unused internal telephone line 206. At least one telephone station 214 may also be coupled to unused internal telephone line 206. Other telephones 114 may optionally be connected to internal telephone line 106 through jacks.

Interface card 210 may comprise PC interface 118, analog front end (codec) 120 coupled to PC interface 118, and line interface 122 coupled to analog front end 120, all of which have been described with respect to FIG. 2. Interface card 210 may further comprise a ringer 219 coupled to PC interface 118 and to line interface 122.

According to some embodiments of the present invention, a second telephone number is assigned at central office 104 or by an Internet telephony service provider. In these embodiments, in addition to internal telephone line 106, an additional logical telephone line for at least one telephone station 214 may be created.

An ADSL channel 102A may carry two telephone sessions simultaneously with data; one telephone session (using the first telephone number) destined for telephone stations 114 and the other telephone session (using the second telephone number) destined for telephone stations 214. Other high-bandwidth channels, such as DSL line and cable (102B and 102C) may carry an additional telephone session destined for telephone stations 214 simultaneously with data.

Figure 5:
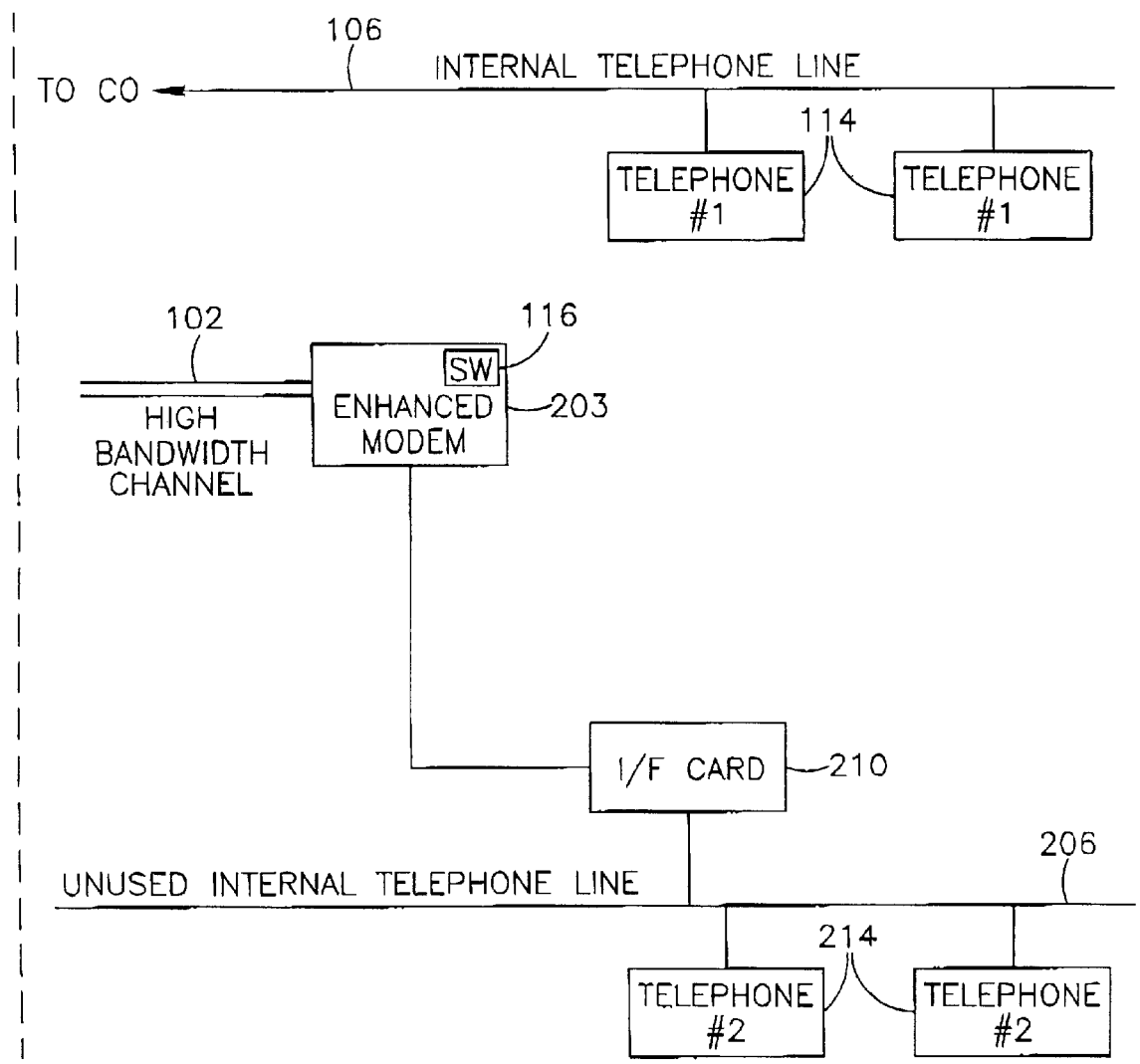
FIG. 5 is a block diagram illustration of a CPE system for enabling one extra telephone session using over an external high-bandwidth channel and an existing unused telephone wire coupled to an enhanced broadband modem serving as a gateway, according to some embodiments of the present invention.

Reference is now made to FIG. 5, which is a block diagram illustration of a CPE system for enabling one extra telephone session over an external high-bandwidth channel and an existing unused telephone wire, according to some embodiments of the present invention. In these embodiments, gateway software 116 may be installed in the broadband modem to create an enhanced broadband modem 203. Enhanced BB modem may be coupled to I/F card 210. I/F card 210 may be also coupled unused internal telephone line 206. The data packets may be provided to a PC (not shown). The voice packets may be converted to analog samples and to telephone control signals and may be provided via line 206 to telephone stations 214.

Figure 6:
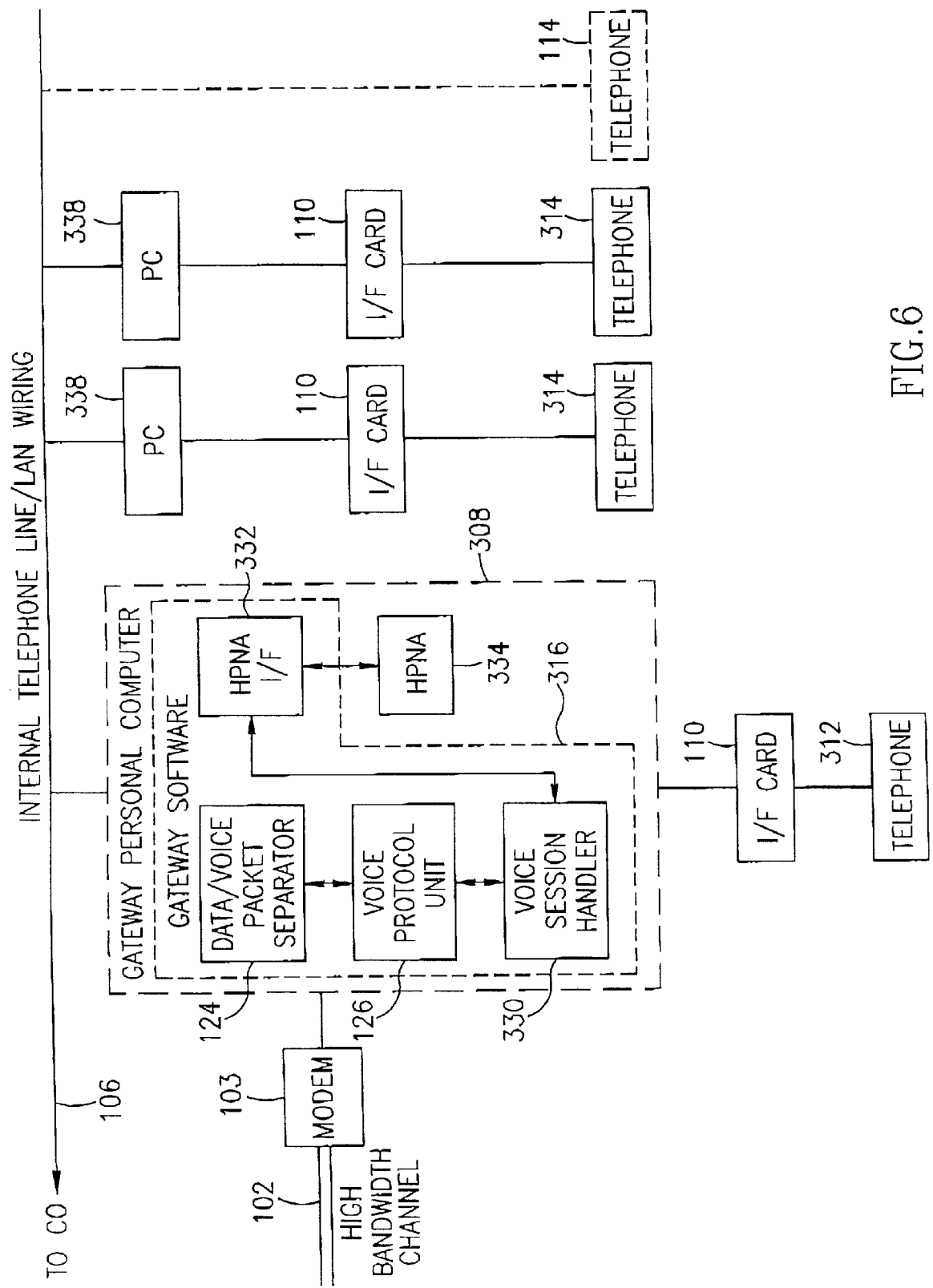
FIG. 6 is a block diagram illustration of a CPE system for enabling multiple extra telephone sessions over an external high-bandwidth channel, according to some embodiments of the present invention.

Reference is now made to FIG. 6, which is a block diagram illustration of a CPE system for enabling multiple extra telephone sessions over an external high-bandwidth channel, according to some embodiments of the present invention. External high-bandwidth channel 102 may be coupled but not necessarily physically connected to an internal telephone line 106 at the CPE. A first telephone number may be assigned by central office 104 (not shown in FIG. 6) to internal telephone line 106.

Internal telephone line 106 may be coupled to CO 104 via an external telephone wire in as in the case of DSL and cable described in FIGS. 1B and 1C, respectively. Alternatively, telephone line 106 may be coupled to CO 104 via high-bandwidth channel 102 as described in FIG. 1A for an ADSL line.

The CPE system may comprise a gateway PC 308 coupled to BB modem 103, interface card 110, and a telephone station 312 coupled to interface card 110. The system may further comprise additional personal computers 338 coupled via internal telephone line 106 or LAN wiring to gateway PC 308. The system may further comprise telephone stations 314 each coupled via interface card 110 to personal computer 338. Interface cards 110 may be either installed inside personal computers 308 and 338 or externally coupled to the personal computers.

Gateway personal computer 308 may comprise gateway software 316, which will be described in further detail hereinbelow, and an HPNA unit 334. HPNA unit 334 may convert internal telephone line 106 into a LAN having an addressable port at each jack. An example of a commercially available HPNA unit is AnyPoint Home Network from Intel Corporation of Santa Clara, Calif.

According to some embodiments of the present invention, additional telephone numbers may be assigned at central office 104 to internal telephone line 106, one additional telephone number for each telephone station 314 coupled via interface card 110 to one of personal computers 338, and one additional telephone number for telephone station 312. Alternatively, the additional telephone numbers may be assigned by an Internet telephony service provider.

High-bandwidth channel 102 may cary multiple telephone sessions simultaneously with data; one telephone session for each telephone station 314 and one telephone session destined for telephone station 312.

Gateway software 316 may comprise data/voice packet separator 124 and voice protocol unit 126, both of which have been described with respect to FIG. 2. Gateway software 316 may further comprise a voice session handler 330 coupled to voice protocol unit 126, and an HPNA interface 332 coupled to voice session handler 330 and to HPNA unit 334. Non-limiting examples of HPNA interface 332 include Home Phoneline Network Interface from Silicom Ltd. of Kfar-Sava, Israel and HorneFree Phoneline from Diamond Multimedia Systems Inc. of San Jose, Calif. Alternatively, HPNA unit 334 and HPNA interface 332 may be replaced by other interfaces enabling the transfer of information over a LAN.

Voice session handler 330 may convert the extracted voice packets to LAN packets, may simplify the telephone session control messages, and may transfer the voice packets for each telephone session to HPNA interface 332. HPNA interface 332 is a bridge to HPNA unit 334. Voice session handler 330 may translate the port ID's assigned to the various telephone numbers of the "logical" telephone lines to the LAN addresses of the ports of the internal telephone line 106.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A telephony method, comprising:
   providing a digital subscriber line (DSL) service over a telephone wire between a central office and a customer premises;
   assigning a first telephone number at the central office to the customer premises for use in providing analog telephone service over the telephone wire simultaneously with the DSL service;
   assigning a second telephone number at the central office to the customer premises for use in providing packetized digital telephone service over the telephone wire using the DSL service;
   receiving at the central office first and second telephone calls placed to the first and second telephone numbers; and
   conveying the first and second telephone calls to the customer premises over the telephone wire, using the analog telephone service and the packetized digital telephone service simultaneously.

2. The method according to claim 1, and comprising conveying data traffic over the telephone wire using the DSL service simultaneously with the first and second telephone calls.

3. The method according to claim 1, wherein conveying the first and second telephone calls comprises receiving both the first and second telephone calls using first and second analog telephone stations, respectively, at the customer premises.

4. The method according to claim 3, wherein conveying the second telephone call comprises conveying voice packets over the telephone wire to the customer premises using the DSL service, and wherein receiving the second telephone call at the customer premises comprises extracting the voice packets from the DSL service and converting the voice packets to analog signals for reception by the second analog telephone station.

5. The method according to claim 4, wherein receiving the second telephone call comprises coupling an unused internal telephone line in the customer premises to receive the analog signals, and coupling a plurality of analog telephone stations, including the second analog telephone station to the internal telephone line.

6. A system for telephony, comprising:

central office (CO) equipment, which is adapted to provide a digital subscriber line (DSL) service over a telephone wire to a customer premises, while assigning a first telephone number to the customer premises for use in providing analog telephone service over the telephone wire simultaneously with the DSL service, and assigning a second telephone number to the customer premises for use in providing packetized digital telephone service over the telephone wire using the DSL service; and customer premises equipment (CPE), which is adapted to receive first and second telephone calls placed to the first and second telephone numbers and conveyed from the CO over the telephone wire simultaneously using the analog telephone service and the packetized digital telephone service, the CPE equipment comprising:
- a first analog telephone station, coupled to the telephone wire for receiving the first telephone call;
- a DSL modem, coupled to the telephone wire for receiving the DSL service and generating a digital output;
- a computer, coupled to the DSL modem and having gateway software for extracting data associated with the second telephone call from the digital output;
- an interface card, coupled to the computer for converting the extracted data into an analog telephone output; and
- a second analog telephone station, coupled to the interface card so as to receive the second telephone call.

7. The apparatus according to claim 6, wherein the CO equipment is adapted to convey data traffic over the telephone wire using the DSL service simultaneously with the first and second telephone calls, and wherein the computer is adapted to extract the data associated with the second telephone call from the data traffic.

8. The apparatus according to claim 6, wherein the interface card is coupled to generate the analog telephone output on an unused internal telephone line in the customer premises, and wherein the second analog telephone station is one of a plurality of analog telephone stations that are coupled to the internal telephone line.

* * * * *